(12) United States Patent
Jain et al.

(10) Patent No.: US 11,265,268 B1
(45) Date of Patent: Mar. 1, 2022

(54) HIGH-THROUGHPUT MULTI-NODE INTEGRATED CIRCUITS

(71) Applicant: Innovium, Inc., San Jose, CA (US)

(72) Inventors: Ajit K. Jain, Cupertino, CA (US); Avinash Gyanendra Mani, San Jose, CA (US); Mohammad Kamel Issa, Los Altos, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 16/780,214

(22) Filed: Feb. 3, 2020

(51) Int. Cl.
*H04L 12/935* (2013.01)
*H04L 49/00* (2022.01)
*H04L 1/00* (2006.01)

(52) U.S. Cl.
CPC ............ *H04L 49/30* (2013.01); *H04L 1/0061* (2013.01); *H04L 49/3027* (2013.01)

(58) Field of Classification Search
None
See application file for complete search history.

(56) References Cited

U.S. PATENT DOCUMENTS

| 8,738,860 | B1 * | 5/2014 | Griffin | G06F 13/4022 711/122 |
| 2005/0207436 | A1 * | 9/2005 | Varma | H04L 1/0083 370/412 |

* cited by examiner

*Primary Examiner* — Kouroush Mohebbi

(57) ABSTRACT

The technology described in this document can be embodied in an integrated circuit device comprises a first data processing unit comprising one or more input ports for receiving incoming data, one or more inter-unit data links that couple the first data processing unit to one or more other data processing units, a first ingress management module connected to the one or more inter-unit data links, the first ingress management module configured to store the incoming data, and forward the stored data to the one or more inter-unit data links as multiple data packets, and a first ingress processing module. The integrated circuit device also comprises a second data processing unit comprising one or more output ports for transmitting outgoing data, and a second ingress management module connected to the one or more inter-unit data links.

20 Claims, 5 Drawing Sheets

HIGH-THROUGHPUT MULTI-NODE INTEGRATED CIRCUITS

TECHNICAL FIELD

This disclosure generally relates to network switches configured to achieve high bandwidth data transition with low overhead.

BACKGROUND

Today's data centers contain large-scale clusters or computers with significant aggregate bandwidth requirements. One bottleneck in such large-scale clusters is inter-node communication bandwidth and overhead, which complicates application design and limits overall system performance.

SUMMARY

In one aspect, this disclosure features an integrated circuit device that includes a first data processing unit and a second data processing unit. The first data processing unit includes one or more input ports for receiving incoming data, one or more inter-unit data links that couple the first data processing unit to one or more other data processing units, and a first ingress management module connected to the one or more inter-unit data links. The first ingress management module is configured to store the incoming data, forward the stored data to the one or more inter-unit data links as multiple data packets, generate metadata associated with the multiple data packets, and forward the metadata associated with the multiple data packets to the one or more inter-unit data links. The second data processing unit includes one or more output ports for transmitting outgoing data, and a second ingress management module connected to the one or more inter-unit data links. The second ingress management module is configured to receive and store at least a portion of the incoming data also stored by the first ingress management module, receive at least a portion of the metadata associated with the multiple data packets, and route at least a subset of the multiple data packets to the one or more output ports as the outgoing data based on the metadata corresponding to the subset of the multiple data packets.

In another aspect, this disclosure features a method of routing data in a network. The method includes receiving incoming data at one or more input ports of a first data processing unit of an integrated circuit device configured to perform as a network switch, storing the incoming data at the first data processing unit, and forward the incoming data in a form of multiple repackaged data packets to at least one second data processing unit of the integrated circuit device through one or more inter-unit data links of the integrated circuit device, the one or more inter-unit data links configured to provide internal connections among a plurality of data processing units of the integrated circuit device. The method also includes generating metadata associated with the multiple repackaged data packets, wherein the metadata includes information usable by the at least one second data processing unit to route the data included in the multiple repackaged data packets, and forwarding the generated metadata to the at least one second data processing unit through the one or more inter-unit data links.

The above aspects can include one or more of the following features.

Each of the first data processing unit and the second data processing units can be a die of the integrated circuit device. Each of the one or more inter-unit data links can be a die-to-die link. The second data processing unit can include a third ingress management module configured to generate additional data packets and metadata based on data received by one or more input ports of the second data processing unit. The subset of the multiple data packets routed by the second ingress management module can bypass the third ingress management module. A first packet size associated with the multiple data packets can be different from a second packet size associated with the data received at the one or more input ports. A first time stamp associated with a data packet of the multiple data packets can be different from a second time stamp associated with the corresponding metadata. The first ingress management module can include an error control engine configured to include multiple error correction bits in one or more of the multiple data packets. The first ingress management module can be configured to implement a scheme to re-synchronize the multiple data packets and the corresponding metadata, in response to one or more errors being detected on at least one of the multiple data packets and metadata. The second ingress management module can be further configured to determine, based on the multiple error correction bits, that at least a portion of the metadata have not been received correctly, and in response to determining that multiple metadata have not been received correctly, initiate a loss management scheme for the corresponding portion of the metadata. The second ingress management module can be configured to determine, based on the multiple error correction bits, that one or more of the multiple data packets have not been received correctly; and in response to that one or more of the multiple data packets have not been received correctly, initiate a loss management scheme for the corresponding data packets. The first ingress management module can include a data packet processor that is configured to accumulate the multiple data packets, and generate multiple data units for transmission between the first data processing unit and the second data processing unit, wherein a size of a data unit of the multiple data units is different from a size of a data packet of the multiple data packets. The one or more inter-unit data links include a first serializer-deserializer (SERDES) disposed on the first data processing unit for transmitting data output by the data packet processor. The one or more inter-unit data links can include a second SERDES disposed on the second data processing unit for receiving the data transmitted by the first SERDES. The second data processing unit can include a data packet assembler that is configured to receive the multiple data units, perform error checks on the received multiple data units, and assemble the multiple data units into units having the size equal to that of a data packet of the multiple data packets. Each of the one or more output ports can be configured to output data from one or more corresponding output queues. The second data processing unit can further include an egress processing module configured to assign the subset of the multiple data packets to the one or more output queues based on priority information associated with the corresponding data packets.

In some implementations, the technology described herein may provide one or more of the following advantages.

The technology described in this document relates to integrated circuits that include multiple subunits (referred to herein as nodes or data processing units) that are connected for network switches. The multiple nodes are coupled through an inter node links (INLs) on the integrated circuit and allow data received at one node to be retransmitted from not just the output ports of the receiving node, but also the output ports of the one or more of the other nodes. In the integrated circuit device, the multiple nodes coupled with the INLs behaves like a single unit. Any processing on the received data can be performed only on the receiving node and shared with the other nodes via the INLs. By making incoming data available at multiple output ports without substantially increasing the processing overhead, the technology described herein can thus improve switching speeds manifold as compared to single-node integrated circuits for network switches.

In some implementations, incoming data is received on input ports of multiple nodes of the integrated circuit. Each of the receiving node can act as a master node that stores and processes the incoming data to route the data to intended destination ports. In addition, the master node forwards the incoming data to one or more other nodes of the integrated circuits through the INLs together with metadata that includes control information (e.g. destination information, accounting check information etc.) associated with the incoming data. The one or more other nodes each act as a slave node that route the data to corresponding egress ports of the network switch without additional processing, but based on the control information received from the master node. By making the data available at the egress ports of the slave nodes (in addition to the egress ports of the master node) without the need of additional processing overhead, the technology described herein can increase the throughput of network switches or other network devices as compared to single node integrated circuits for network switching.

In some implementations, a receiving node (or master node) may be configured to buffer the incoming data. In such cases, the one or more slave nodes may mirror the stored incoming data using the control information from Master node. The data forwarded to the slave node will mirror the stored incoming data in the master node with a constant shift in time.

In some implementations, a receiving node (or master node) may have inadequate memory capacity to buffer a particular portion of the incoming data.

In such cases, handling the routing of the incoming data with one or more additional slave nodes can provide for an enlarged effective buffer, and therefore allow the underlying network switch to handle large volumes of data that is not delimited by the capacity of the master node alone.

In some implementations, to ensure reliability of data transfer between multiple nodes (e.g., a master node and one or more slave nodes), the master node can be configured to incorporate one or more error correction bits to the incoming data packets to detect errors during the data transfer from the master node to the one or more slave nodes of the integrated circuit. An ingress management module of a slave node can be configured to check for any errors based on the one or more error correction bits, and any erroneous packets can be ignored accordingly. The ingress management module can also be configured to self correct by generating dummy transactions either inline or as part of a background thread.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

Figure 1:
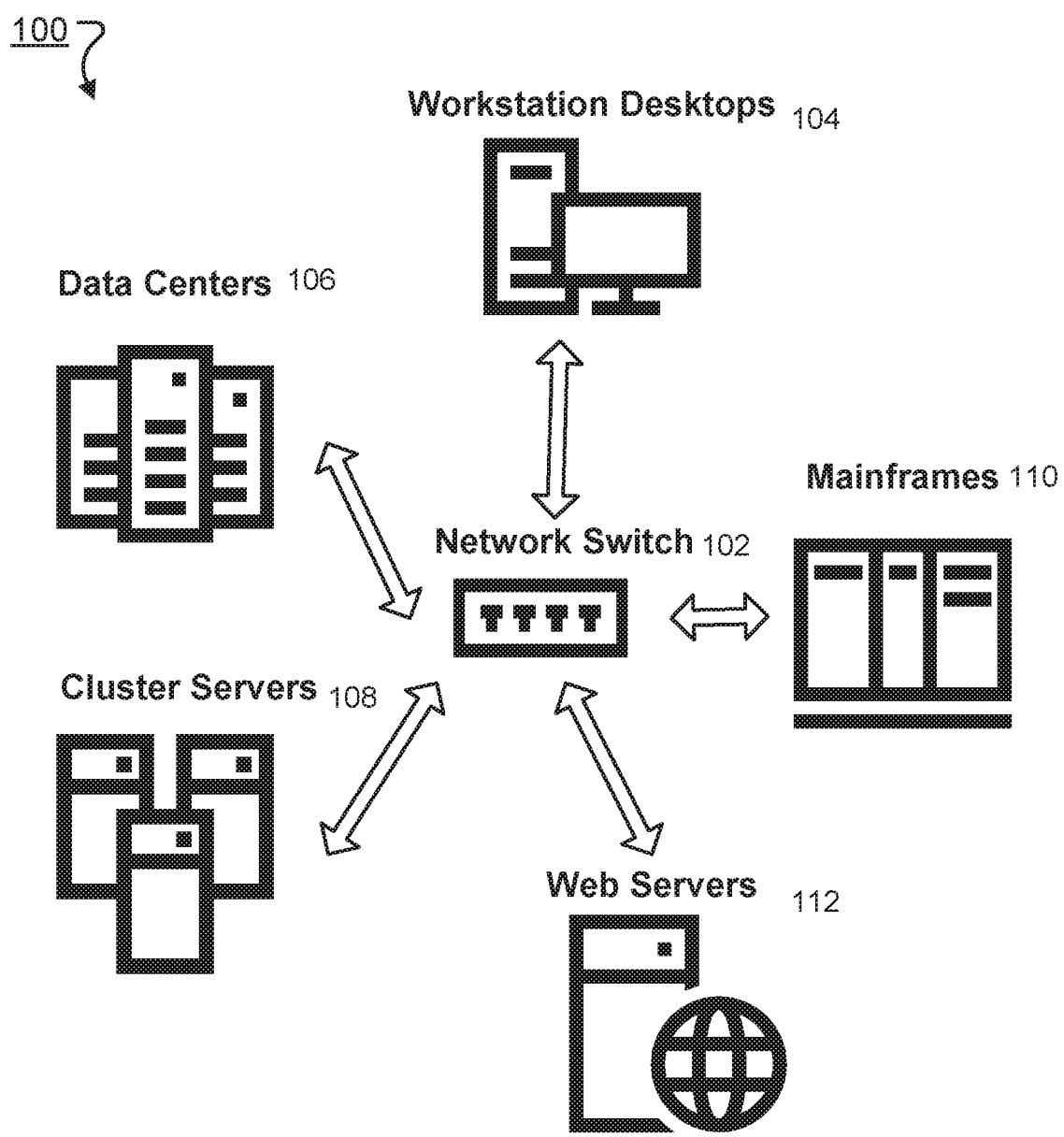
FIG. 1 is a diagram of an example environment within which a network switch operates.

The technology described in this document is embodied in integrated circuits for network switches, wherein each integrated circuit includes multiple subunits (referred to herein as nodes) that are connected to one another via high-speed inter-node links (INLs) or inter-unit data links. In some implementations, the subunits form various dies in an integrated circuit, and the inter-unit data links are die-to-die links. The presence of multiple nodes on one integrated circuit allows for the data received at one node to be retransmitted from not just the output ports of the receiving node, but also the output ports of the one or more of the other nodes. Any processing on the received data can be performed only on one node and shared with the other nodes via the high-speed INLs. By making incoming data available at multiple output ports without substantially increasing the processing overhead, the technology described herein can thus improve switching speeds manifold as compared to single-node switching ICs.

In some implementations, the incoming data that is received by one or more receiving nodes (also interchangeably referred to herein as master nodes) of the integrated circuit may include data packets of various sizes. Incoming data may be repackaged into multiple data packets by a master node based on, for example, a bandwidth of the internal data transition between the master node and one or more other nodes (also interchangeably referred to herein as slave nodes). The size of the data packets or data units generated by the master node can be different from the size of the incoming data packets. In addition, the receiving node processes the incoming data, for example, to generate/extract control information (e.g. destination of the data flow, priority information, scheduling information etc.) as metadata. In some implementations, a time stamp associated with a particular data packet can be different from a time stamp associated with the corresponding metadata. Both the multiple data packets and the metadata generated by the master node can be transmitted to other nodes of the integrated circuits through the INLs. In some implementations, the multiple data packets and corresponding metadata can be transferred in different time windows. The multiple data packets can be stored at a slave node, and then coalesced together with corresponding metadata to generate outbound data packets to be routed through one or more egress ports of the corresponding slave node.

As such, this technology provides a method to replicate the incoming data from one node of the integrated circuit to another, in a same or different packet data unit (PDU) format as compared to that of the incoming data, together with corresponding metadata. The master-slave configuration can be bidirectional (with the master node for a particular set of ingress ports acting as a slave node for another node having a different set of ingress ports), allowing the integrated circuit to be configured to independently handle switching of two or more sets of incoming data received at multiple nodes of the integrated circuit.

In some implementations, the technology described herein can be used to implement output-queued devices. In such cases, traffic management module of a slave node can be configured to assign data packets received from a master node to one or more output queues based on, for example, priority information or destination information (or both) associated with the corresponding data packets.

FIG. 1 is a diagram of an example environment within which a network switch 102 operates. A network switch generally connects various electronic devices in a network, and employs data packets switching to receive and forward data from an original device to a destination device. In some implementations, the network switch 102 may forward data at a network layer by additionally routing functionalities. As illustrated in FIG. 1, in some implementations, the network switch 102 may connect to a data center 106 or cluster servers 108 for high-performance computing and massively scalable data processing through providing a high bandwidth data transition. In some implementations, the network switch 102 may connect to workstation desktops/laptops 104 and web servers 112, for example, to provide more Ethernet ports for the connected devices. In some implementations, the network switch 102 may connect to a mainframe computer 110, for example, to assign more than one physical paths to a backbone network, while achieving a high volume of data transactions and input/output operations in parallel. With the advent of the ever-increasing number of connected devices, bandwidth requirements of networks have evolved greatly in the recent times, often reaching potentially more than tens of Terabits/sec (Tb/s). This in turn has given rise to the requirements of high throughput network switches that can efficiently support the demands of high-bandwidth networks.

Figure 2:
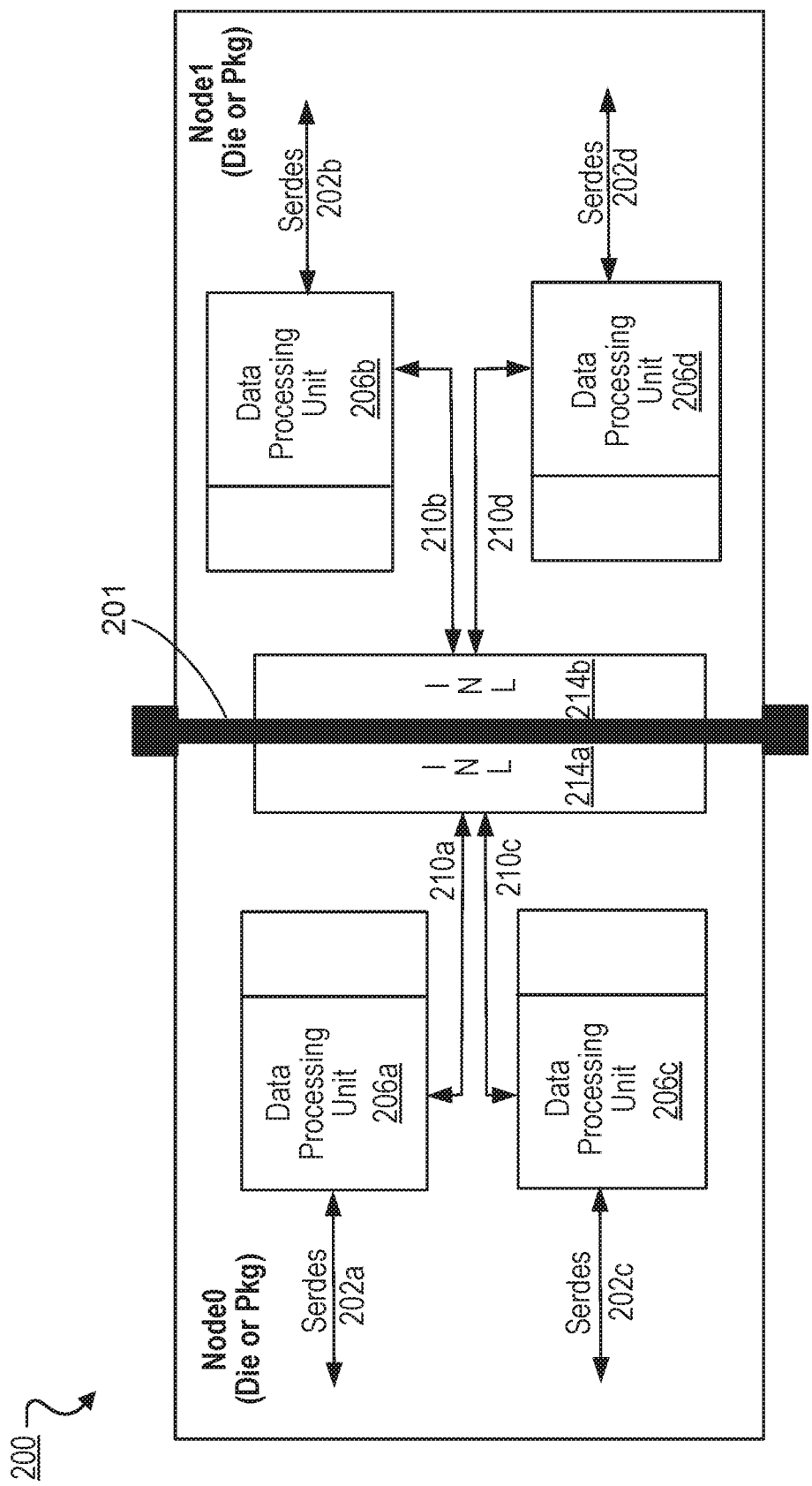
FIG. 2 is a block diagram of an example integrated circuit device for a network switch, the integrated circuit device having multiple nodes in accordance with technology described herein.

The technology described herein provides for network switches where multiple switching nodes are disposed on the same integrated circuit, and pairs of nodes act in master slave configurations to make additional egress ports available to incoming data without significantly increasing processing overhead. FIG. 2 is a block diagram of an example of such an integrated circuit device 200 on a network switch 102. The integrated circuit device 200, as shown in FIG. 2 includes two nodes: referred to as node 0 on the left and node 1 on the right. At the outset, it should be noted that the two node configuration of FIG. 2 is for illustrative purposes, and more nodes can be disposed on similar integrated circuits without deviating from the scope of this disclosure. In some implementations, each node of the integrated circuit device 200 may represent a die or a package of the integrated circuit device 200. In this illustration, each node of the integrated circuit device 200 includes one or more data processing units and Inter Node Links (INL) such as die-to-die links. The INLs are configured to transfer the data between the nodes, each of which has its own input/output ports (also referred to herein interchangeably as ingress/egress ports, respectively). The input/outputs ports of two nodes can be the same or different. For example, in some cases where the input/output ports are connected to corresponding serializer/deserialzers (SERDES), the SERDES speed for the nodes/ports can be different from one another.

In some implementations, each node can include multiple data processing units 206a, 206b etc. (206, in general) that can perform switching and/or other functionalities. As shown in FIG. 2, the node 0 includes a data processing unit 206a, a data processing unit 206c and an INL 214a. Similarly, the node 1 has a data processing unit 206b, a data processing unit 206d, and an INL 214b. In some implementations, the node 0 and node 1 can have substantially similar configurations of internal circuit components and are coupled by a data communication bus 201 disposed at the boundary of the nodes. While the example in FIG. 2 shows a single INL 214a or 214b (214, in general) for each node, other configurations are also possible. For example, data processing unit 206a and 206b may communicate with one another using a dedicated set of one or more INLs, while data processing units 206c and 206d may communicate with one another using a separate dedicated set of one or more INLs.

In this illustration, the data processing unit 206a of node 0 includes a SERDES configured to process incoming data 202a and forward data to another portion of the node or other nodes: e.g., the node 1, through the INL 214a and the data lines 210a. The incoming data can be routed from one or more egress ports of the receiving node. The incoming data at one node may also be forwarded to and stored in a data processing unit of another node, and routed therefrom. The data processing unit 206a may also be configured to obtain data from other portions of the node 0 or other nodes through the INL 214a and data lines 210a. The data processing unit 206a may further process the incoming data 202a (e.g., by performing accounting check and error check) and send out the resulting control information through the data lines 210a. The control information may be transferred as metadata from the data processing unit 206a to the other nodes through the INL 214a. The metadata may be transferred by the data lines 210a to one or more other nodes of the integrated circuit device 200. By generating the control information at one node, but making additional egress ports of one or more other nodes available for the switching operations, the technology described herein can improve throughput as compared to single-node integrated circuits. The data processing unit 206a may also store the incoming data 202a while forwarding the incoming data to other portions of the node 0 or other nodes of the integrated circuit device 200. In this illustration, the data processing unit 206a is the master node and the data processing unit 206b is one of the slave nodes of the integrated circuit device 200. The slave nodes cn be configured to use the full or partial control information transferred from the master node and mirror/follow the data storage of the receiving/master node.

Similarly, the data processing unit 206c receives incoming data 202c and sends the data to other portions of the node 0 or other nodes, e.g., node 1 of the integrated circuit device 200, through the INL 214a and data lines 210c. In some implementations, the data lines 210a and 210c may have the same speed, or a different speed, as compared to that of the incoming data at the data processing units 206a and 206c. In some implementations, the incoming data packets may be repackaged into multiple data packets or data units of a different size (as compared to the size of the incoming data packets), by a mini packet generator of the corresponding data processing unit prior to transmission to another node.

In some implementations, the second node (node 1) has a same configuration as that of node 0. For example, node 1 of the integrated circuit device 200 includes a data processing unit 206b and a data processing unit 206d that receive incoming data 202b and 202d, respectively. The data processing units 206b and 206d are configured to store and forward the received incoming data packets to other portions of the node 1 or other nodes of the integrated circuit device 200, e.g., the node 0, through the INL 214b and the data lines 210*b* and 210*d*, respectively. The data processing unit 206*b* and 206*d* are also configured to process the incoming data and forward the corresponding control information as metadata to other nodes of the integrated circuit device 200 through the data lines 210*b* and 210*d*. Similar to the aforementioned operations of node 0, the forwarded data packets from the data processing unit 206*b* or 206*d* may be stored in a data processing unit of other node, e.g., the node 0, with a delay. In some implementations, the integrated circuit device 200 may include multiple nodes, for example, 4 nodes or 8 nodes. Each node can be configured to have substantially the same configuration as described above and coupled to other nodes through the INLs. At the system level, the integrated circuit device 200 can be implemented as an application-specific integrated circuit (ASIC) so that a central processing unit (CPU) can drive multiple nodes of an integrated circuit device. The CPU of the integrated circuit device 200 may be present on either one of the nodes of the integrated circuit device 200.

In some implementations, the bandwidth of the integrated circuit device 200 may be improved by coupling two or more nodes together through the INLs. For example, each of the nodes in FIG. 2 may have a particular bandwidth and the integrated circuit device 200 may perform at a bandwidth that is at least twice the particular bandwidth, by combining all the bandwidths of its internal nodes for data transmission. The integrated circuit device 200 may receive multiple incoming data lines at different internal nodes and process the multiple incoming data lines in parallel. In some implementations, the bandwidth of the integrated circuit device 200 can be substantially same as the bandwidth of an internal node, but the multi-node configuration can provide larger data buffers. For example, the integrated circuit device 200 may be configured to have a bandwidth which is similar to the bandwidth of an individual node, but can provide a larger data buffer size by sharing the buffers of multiple nodes.

Figure 3:
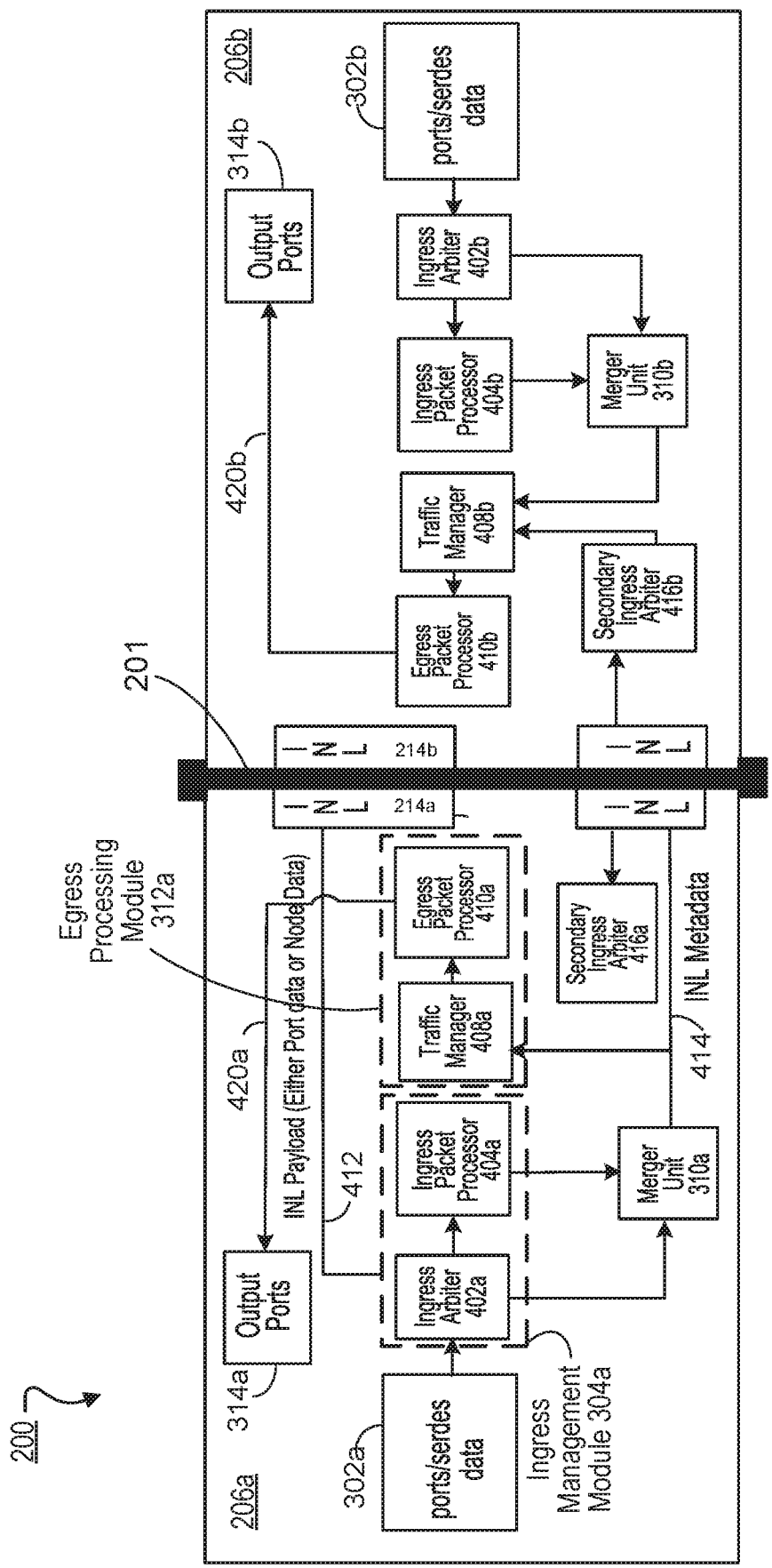
FIG. 3 is a block diagram that illustrates details of the multiple nodes of the integrated circuit of FIG. 2.

FIG. 3 is a block diagram that illustrates details of the multiple nodes of the integrated circuit 200 of FIG. 2. Specifically, FIG. 3 illustrates details of the data processing units 206*a* and 206*b*. Details of the data processing units 206*c* and 206*d* can be substantially similar, and have not been described separately. The data processing units 206*a* and 206*b* are coupled by the communication bus 201. In this illustration, the data processing units 206*a* and 206*b* have same configurations and include symmetric components therein. The data processing unit 206*a*, as shown in FIG. 3, includes one or more input ports 302*a*, an ingress management module 304*a*, a merger unit 310*a*, an egress processing module 312*a*, one or more output ports 314*a*, and one or more INLs 214*a*.

In the data processing unit 206*a*, the one or more input ports 302*a* are configured for receiving incoming data packets. The data packets can be received from another similar integrated circuit device, or from an external network. The data processing unit 206*a* also includes one or more output ports 314*a* that are configured to transmit outgoing data packets based on the switching operation performed by the integrated circuit device 200. In some implementations, the integrated circuit 200 can be an output-queued device in which data packets coming in through the one or more input ports are stored in one or more corresponding output queues based on the destination and/or priority of the corresponding packets. In some implementations, the integrated circuit 200 can be an input-queued device in which the data packets coming in through the one or more input ports are stored in one or more queues based on the port on which they arrived. The data packets coming in through the one or more input ports can be queued in a buffer on the master node and/or in a slave node. For illustrative purposes, the input ports 302*a* and the output ports 314*a* are depicted as separate ports, but in some implementations the input/output ports can be disposed in a single port module on the integrated circuit device 300.

The data processing unit 206*a* includes an ingress management module 304*a*. The ingress management module 304*a* connects with the one or more input ports 302*a* and one or more INLs 214*a*. In some implementations, the ingress management module 304*a* includes an ingress packet processor 404*a* (also referred to herein as a data packet processor) that is configured to forward the incoming data packets to an egress processing module 312*a* for the routing of the data packets through the output ports 314*a*. In some implementations, the ingress management module 304*a* includes an ingress arbiter 402*a* that determines the order in which the incoming data packets get access to the Ingress packet processor 404*a* and egress processing module 312*a*. For example, the ingress arbiter 402*a* can be configured to process the incoming data packets to perform accounting check, error checks etc., and also to determine a priority of the data packets. In some other implementations, the ingress arbiter 402*a* also stores the incoming data packets. The ingress arbiter can route the data packets to a traffic manager 408*a* of the egress processing module 312*a* for the packet to be routed accordingly. The ingress management module 304*a* can also be configured to forward incoming data packets to a slave node (to the corresponding data processing unit 206*b*, in this example) via one or more INLs 214*a*. In such cases, the ingress management module 304*a* can be configured to repackage the incoming data packets into internal data packets (also referred to herein as data units) of a different size that conforms to the internal communication bandwidth between the nodes. The ingress management module 304*a* can also be configured to generate control information (accounting check information, error check information, destination information, storage control etc.) and associate the control information with the corresponding internal data packets transmitted to the slave node through the data line 412. The control information itself can be transmitted as metadata, potentially through a separate data line 414, to the slave node. In some implementations, the repackaged internal data packets and the corresponding control information can be coalesced into outbound data packets and provided to a traffic manager of the egress processing module of the master node for routing to the output ports 314*a*.

The data transmitted to a slave node via the data line 412 and the corresponding metadata transmitted through the data line 414 can be coalesced at a secondary ingress arbiter 416*b* of the slave node to generate the data packets to be routed through the output ports 314*b* of the slave node. Notably, the secondary ingress arbiter (also referred to herein as a data packet assembler) receives the control information associated with the payload data in the form of metadata received from the master node, and can therefore provide the coalesced data packets directly to the traffic manager 408*b* of the slave node 206*b*. In some implementations, the secondary ingress arbiter 416*b* can also store the same data and in a same order as in the ingress Arbiter 402*a* in the master node 206*a*. Any additional overhead processing to coalesce the payload and metadata (e.g., for error correction etc. implemented at the master node) can be significantly less than the processing performed at the master node to generate the control information. As a result, the data packets can be routed through several additional egress ports 314*b* associated with the slave node 206*b*, without a commensurate increase in overhead processing. This in turn can result in increased throughput and improved switching as compared to, for example, a single node system. As discussed earlier, the master-slave relationships can be bi-directional, with the node 206*a* acting as a slave node for data received at the input ports 302*b* of the node 206*b*. For this, the node 206*a* can include a secondary ingress arbiter 416*a*. Also, while the ingress arbiter 402 has been shown as a separate entity from the secondary ingress arbiter 416, in some implementations, a single ingress arbiter can be used to implement the functionalities of both ingress arbiters 402 and 416.

The first ingress arbiter 402*a* connects to the one or more input ports 302*a* and receives the incoming data packets from the input ports 302*a*. The incoming data packets may be temporarily stored in one or more memory buffers of the ingress arbiter 402*a*. The ingress arbiter 402*a* may include various types of memories including volatile memories and/or non-volatile memories. In some embodiment, each memory buffer is a distinct memory bank, or set of memory banks. In some embodiments, a memory buffer may be a region within a memory bank. The memory buffer of ingress arbiter 402*a* may include many addressable "slots" or "entries" (e.g. rows, columns, etc.) in which data packets may be stored.

When the incoming data packets are received by the integrated circuit device 400, the ingress arbiter 402*a* may be configured to perform all the incoming data processing operations, for example, accounting check and error check. The incoming data packets can be received from one or more input ports 302*a* through a SERDES, or from another node. As shown in FIG. 3, the first ingress arbiter 402*a* also connects to the ingress packet processor 404*a* and the merger unit 310*a*, and is configured to output the stored incoming data through the respective data lines. The ingress arbiter 402*a* is also connected to the INL 214*a*, and outputs incoming data to the INL 214*a* through the INL payload data line 412. The merger unit 310*a* is connected to the INLs through data line 414 and is configured to transmit full or partial metadata and control information from the ingress Arbiter 402*a*.

In general, the individual atomic data units upon which the depicted integrated circuit device typically operate are data packets or cells. That is, data units are received, acted upon, and transmitted at the data packets or cell level. For example, the ingress packet processor 404*a* receives the incoming data packets from the ingress arbiter 402*a* and performs packet data processing. In some implementations, the ingress packet processor 404*a* may be configured to generate the control information as metadata for sending to the merger unit 310*a*. In some other implementations, on the integrated circuit device 400, different nodes may send, receive, or relay data units at different network layers. For instance, an initial node may send a data unit at the network layer (e.g. as a TCP segment) to a destination node over a path that includes an intermediate node. In some implementations, the data unit may be broken into smaller data packets at various sublevels before it is transmitted from the initial node. Eventually the data packets can be sent out as a collection of signal-encoded bits to the intermediate node. Depending on the network type, the intermediate node may rebuild the data packets before routing the information to the destination node.

The merger unit 310*a* is connected to the ingress arbiter 402*a* and the ingress packet processor 404*a*, and configured to receive multiple data packets and control information (e.g. the date destination information), respectively. The merger unit 310*a* may combine the multiple internal data packets generated by the first ingress arbiter 402*a* with the control information (e.g. data destination information) from the ingress packet processor 404*a*. In some implementations, the merger unit 310*a* is configured to send the control information generated by the ingress packet processor 404*a*, to the INL 214*b* through the INL metadata line 414. The metadata can be transmitted to the node 206*b* and written into the secondary ingress arbiter 416*b*.

In some implementations, the egress processing module 312*a* includes a traffic manager 408*a* and an egress packet processor 410*a*. The traffic manager 408*a* is connected to the merger unit 406*a* and the egress packet processor 410*a*. In some implementations, the traffic manager 408*a* is configured to control the flow of data packets to the egress packet processor 410*a*. For example, the traffic manager 408*a* may include queueing logic configured to assign buffered data entries to queues, and manage the flow of data packets through the queues. For example, in an output-queued device, a queue may be defined for each output port and/or priority level, and the queues can be implemented within a memory device disposed in the traffic manager 408*a* (or another portion of the egress processing module). In some implementations, the traffic manager may determine when to dequeue data packets from corresponding queues and provide the dequeued data packets to the egress packet processor 410*a*. In some implementations, the traffic manager 408*a* may perform operations including flow control and traffic shaping logic that prevent certain data packets from being admitted to queues, for example, to enforce various bandwidth constraints.

The egress packet processor 410*a* can be configured to process an outbound data packet based on a forwarding/switching logic. Corresponding operations may include, for example, identifying paths/ports along which to forward the data packets, implementing flow control policies, manipulating data units, and performing statistical or debugging operations.

In some implementations, the incoming data packets are accumulated by the ingress arbiter 402*a* and repackaged into internal data packets of a different size (referred to as mini data packets). In some implementations, each mini data packet may have a particular size based on, for example, the system configurations. For incoming packets smaller than the particular size, the mini data packet size may be equal to the incoming data packet size. For incoming packets larger than the particular size, the mini data packet size may be set to be equal to the particular size. For example, an incoming data packet may be broken into two mini packets of the particular size. Other configurations may also be used, for example, the size of each mini data packet may be variable, or based on a random number. In some implementations, each mini data packet can include control information associated with the data. The control information can be used at a receiving end (e.g., at a secondary ingress arbiter) to obtain the original data packets from the corresponding mini packets.

In some implementations, the ingress management module 304*a* may include an error control engine configured to include multiple error correction bits into the incoming data packets to protect against errors that may occur in the process of transferring the repackaged data packets from a master node to a slave node. In some implementations, error control engine can be configured to implement a forward error correction (FEC) process to guard against data loss.

For example, a notifier or a sequence number may be inserted at the start of every data packet transmitted from a master node to a slave node. The inserted notifier may be linked, for example, to a number of transmit data packets or a number of 64 byte words or other data units. Such notifiers can be used to recover any data loss during the data transition. In some implementations, the secondary ingress arbiter on a slave node may implement a scheme for re-synchronizing data packets from the master and the corresponding metadata in case an error is detected in one or both of a data packet and the corresponding metadata. In some implementations, the repackaged data packets may be retransmitted from the master node to the slave node, based on a determination of occurrence of data loss during a transfer from the master node to the slave node. Alternatively, upon detection of data loss or erroneous packets, the ingress management module of the slave node may be configured to generate dummy packets to replace the lost/compromised data packets.

In some implementations, the one or more INLs 214a transmit the multiple internal data packets and metadata associated with the internal data packets from the master node 206a, to one or more slave nodes 206b. In some implementations, the multiple data packets and metadata can be transmitted separately over different internal data lines, and possibly over different INLs. In some implementations, the INLs 214a, 214b form a die-to-die interface between the master and slave nodes 206a and 206b. In some implementations, the INLs 214a comprise one or more SERDES such as a long-reach SERDES or a short-reach SERDES, for example.

Figure 4:
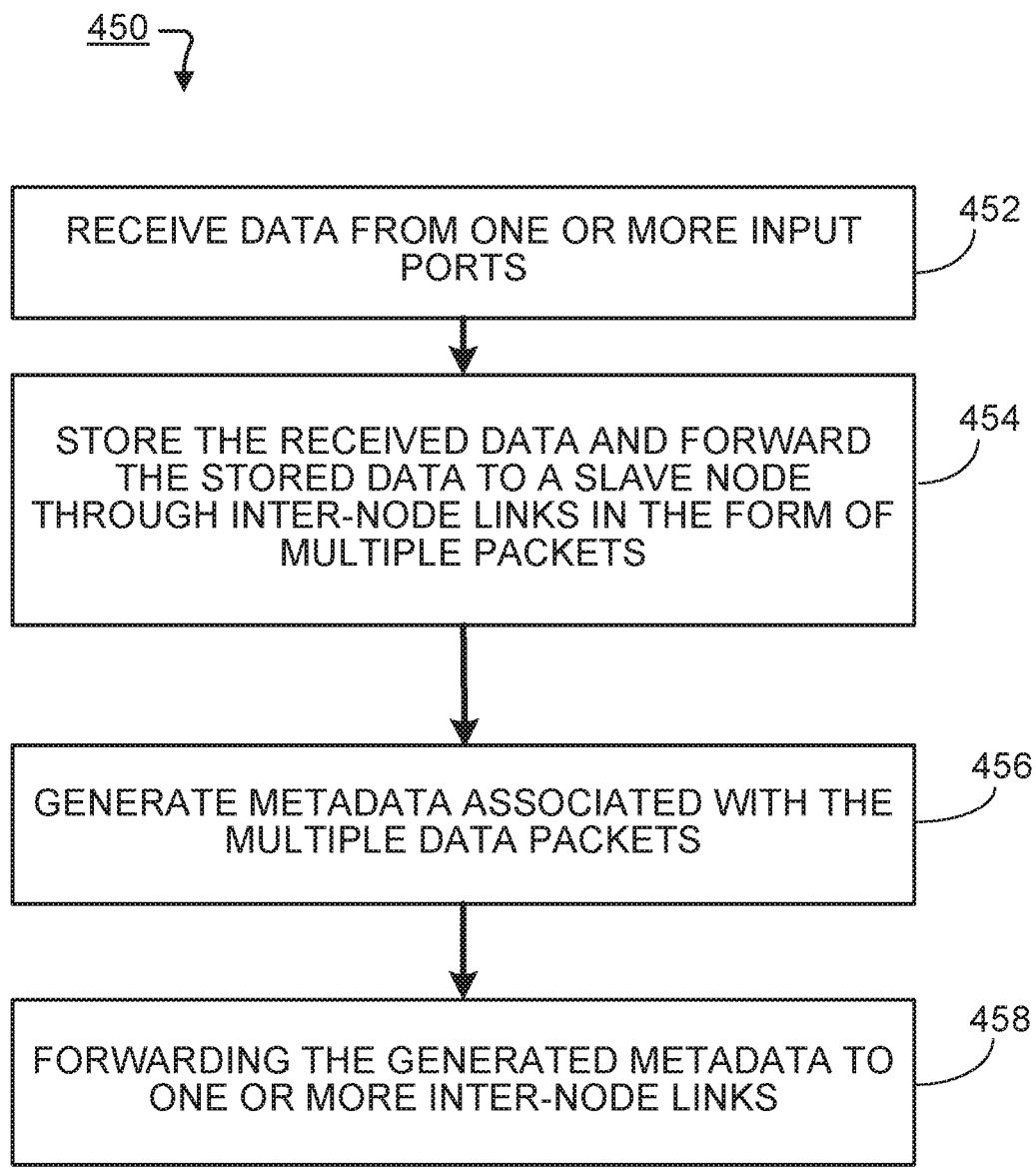
FIG. 4 is a flow chart of an example process for transmitting data packets from a primary processing unit (or master node) to a secondary data processing unit (or slave node) of the integrated circuit of FIGS. 2 and 3.

FIG. 4 is a flow chart of an example process 450 for transmitting incoming data packets from a first processing unit (or master node) to a second data processing unit (or slave node) of the integrated circuit device. In some implementations, at least a portion of the example process 450 can be performed by, for example, by a node (e.g., 206a) of the integrated circuit device 200 described above with reference to FIGS. 2 and 3. Operations of the process 450 can include receiving incoming data from one or more input ports of a first data processing unit of the integrated circuit (452). In some implementations, the first data processing unit may receive incoming data from external network or other portions of the integrated circuit such as another node.

Operations of the process 450 can also include storing the received incoming data in the first data processing unit, and forwarding the stored data to an inter-unit data links in a form of multiple data packets (454). In some implementations, the received incoming data packets may be stored in a buffer of the first data processing unit. The first data processing unit may process the incoming data packets, for example, to perform accounting check and error check. The first data processing unit may repackage the incoming data to multiple internal data packets (also referred to as mini packets) and forward the multiple internal data packets and/or control information to other portion of the integrated circuit through one or more INLs, as described above with reference to FIGS. 2 and 3.

Operations of the process 450 also include generating metadata associated with the multiple data packets (456). The metadata can include control information such as destination information, scheduler information, error check information, and/or information associating the control information to the corresponding data packets. The metadata can be generated by processing the incoming data packets.

In some implementations, this can be done, for example, by an ingress management module described above with reference to FIGS. 2 and 3.

Operations of the process 450 also include forwarding the generated metadata to one or more INLs (458) for the purpose of providing the metadata to one or more slave nodes. The metadata can be transmitted separately (for example, via a different data line and/or different INL) from the multiple internal data packets. The metadata is usable by a slave node to coalesce data packets for routing through one or more egress ports of the slave node.

Figure 5:
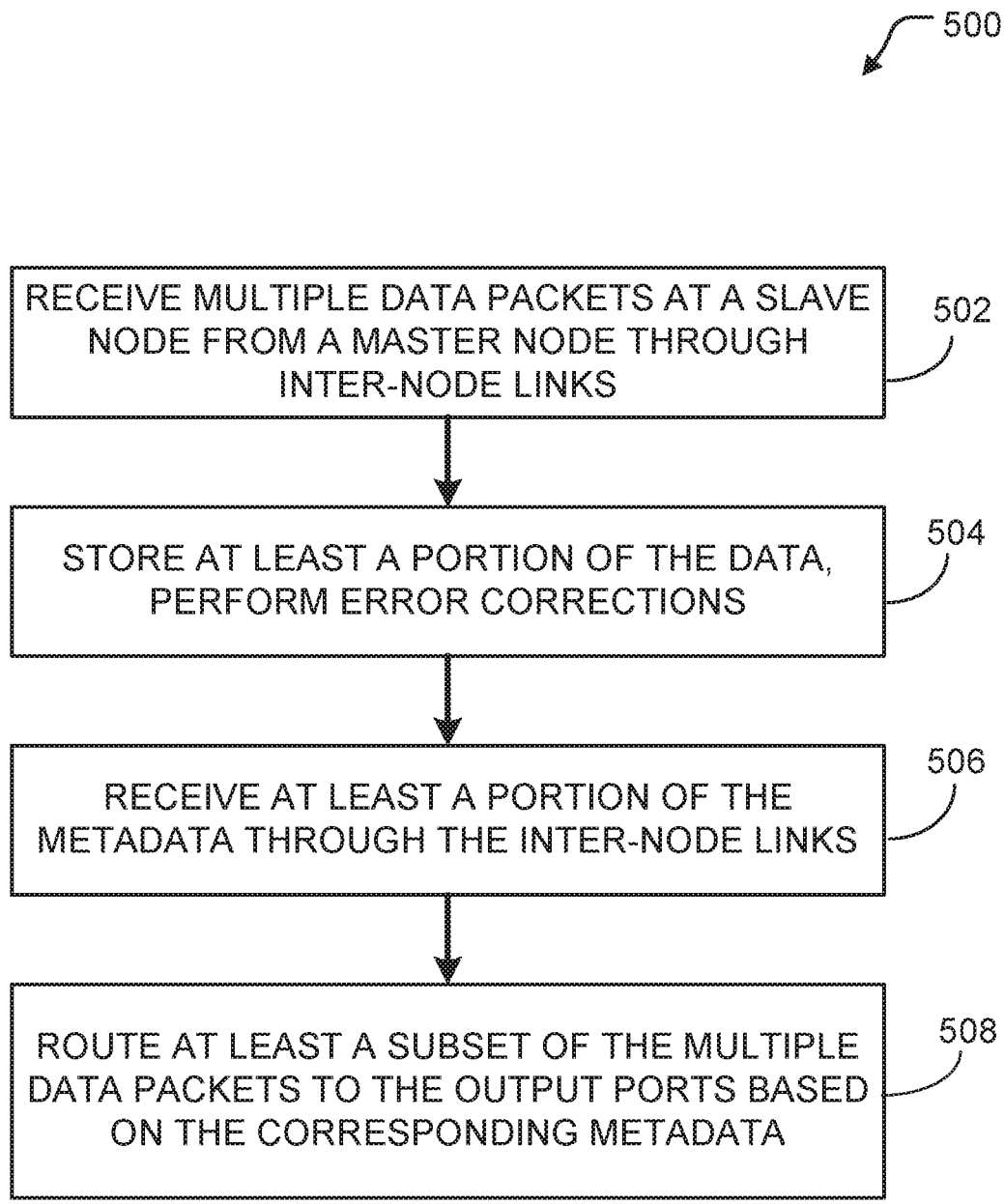
FIG. 5 is a flow chart of an example process at the secondary data processing unit (or slave node) of the integrated circuit of FIGS. 2 and 3.

FIG. 5 is a flow chart of an example process 500 executed by the secondary data processing unit (or slave node) of the integrated circuit device. In some implementations, at least a portion of the example process 500 can be executed at a secondary ingress arbiter 416 and a traffic manager 408 described above with reference to FIG. 3. Operations of the process 500 can include receiving multiple data packets from a master node through one or more INLs (502).

Operations of the process 500 can include storing at least a portion of the data, and performing error corrections to ensure that the data received from the master node is accurate (504). This can include determining, based on multiple error correction bits included in the multiple data packets received through INLs, whether one or more of the multiple data packets have been received correctly by the second data processing unit. If one or more data packets or the corresponding metadata are determined to include an error (or are not received correctly), the slave node may correct the errors and/or initiate a data loss management scheme for the corresponding data packets.

Operations of the process 500 also include receiving at least a portion of the metadata through the INLs (506). The metadata may be received by a secondary ingress arbiter 416 of the slave node, which also receives the multiple data packets. The secondary ingress arbiter can then reconstruct the outbound data packets by coalescing the multiple internal data packets with the corresponding metadata. The secondary ingress arbiter can also mirror the primary ingress arbiter in storing incoming data packets and generating multiple data packets based on control information transferred from the master node. Once the outbound data packets are reconstructed, the secondary ingress arbiter can be configured to provide the outbound data packets to a traffic manager. The multiple data packets and the corresponding metadata can be received separately through INLs in accordance with internal data bus bandwidth restrictions and configurations.

Operations of the process 500 also include routing at least a subset of the multiple data packets to the output ports of the second data processing units, based on the corresponding metadata (508). This can be done, for example, by a traffic manager of the slave node. For example, the metadata may include destination information associated with the multiple data packets, and the traffic manager can be configured to route the corresponding outbound packets accordingly. For example, the second data processing unit may route the transmitted multiple data packets or a subset of the transmitted multiple data packets to the one or more output ports of the second data processing unit, according to the associated metadata that transmitted from the first data processing unit.

In some implementations, the described operations of the first data processing unit can be performed by the second data processing unit on the integrated circuit device. Similarly, the aforementioned operations of the second data processing unit may be performed by the first data processing unit on the integrated circuit device.

In some other implementations, the integrated circuit device includes a plurality of data processing units. At least one of the plurality of data processing units is configured to perform the operations as the first data processing units. At least one data processing unit from the reminders of the plurality of data processing units is configured to perform operations as the second data processing units.

Although an example processing system has been described in FIGS. 2 and 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus.

The term "data processing apparatus" or "data processing unit" refers to data processing hardware and encompasses apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

Other embodiments and applications not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

While this specification contains many specific implementation details, these should not be construed as limitations on the scope of any claims or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

What is claimed is:

1. An integrated circuit device comprising:
 a first data processing unit comprising:
  one or more input ports for receiving incoming first data,
  one or more inter-unit data links that couple the first data processing unit to one or more other data processing units,
  a first ingress management module connected to the one or more inter-unit data links, the first ingress management module configured to:
   store the incoming first data,
   forward the stored first data to the one or more inter-unit data links as multiple data packets,
   generate metadata associated with the multiple data packets, and forward the metadata associated with the multiple data packets to the one or more inter-unit data links; and
 a second data processing unit comprising:
  one or more second input ports for receiving incoming second data,
  one or more output ports for transmitting outgoing data,
  a second ingress management module connected to the one or more second input ports, the second ingress management module including a first ingress arbiter configured to:
   store and process one or more second data packets corresponding to the incoming second data, and
   forward the processed one or more second data packets to an egress processing module for transmitting through the one or more output ports, and
  a second ingress arbiter connected to the one or more inter-unit data links, the second ingress arbiter configured to:
   receive, from the one or more inter-unit data links, (i) at least a portion of the multiple data packets forwarded by the first ingress management module, and (ii) at least a portion of the metadata associated with the multiple data packets, and
   route at least a subset of the received multiple data packets to the one or more output ports as outgoing data based on the received metadata corresponding to the subset of the multiple data packets.

2. The integrated circuit device of claim 1, wherein the first data processing unit is included in a first die of the integrated circuit device and the second data processing units is included in a second die of the integrated circuit device that is distinct from the first die.

3. The integrated circuit device of claim 2, wherein each of the one or more inter-unit data links is a die-to-die link.

4. The integrated circuit device of claim 1, wherein the subset of the received multiple data packets routed by the second ingress arbiter bypasses the second ingress management module.

5. The integrated circuit device of claim 1, wherein a first packet size associated with the multiple data packets is different from a second packet size associated with the data received at the one or more input ports.

6. The integrated circuit device of claim 1, wherein a first time stamp associated with a data packet of the multiple data packets is different from a second time stamp associated with the corresponding metadata.

7. The integrated circuit device of claim 1, wherein the first ingress management module comprises an error control engine configured to include multiple error correction bits in one or more of the multiple data packets.

8. The integrated circuit device of claim 7, wherein the first ingress management module is configured to implement a scheme to re-synchronize the multiple data packets and the corresponding metadata, in response to one or more errors being detected on at least one of the multiple data packets and metadata.

9. The integrated circuit device of claim 7, wherein the second ingress management module is further configured to:
 determine, based on the multiple error correction bits, that at least a portion of the metadata have not been received correctly; and
 in response to determining that multiple metadata have not been received correctly, initiate a loss management scheme for the corresponding portion of the metadata.

10. The integrated circuit device of claim 7, wherein the second ingress arbiter is configured to:
 determine, based on the multiple error correction bits, that one or more of the multiple data packets have not been received correctly; and
 in response to that one or more of the multiple data packets have not been received correctly, initiate a loss management scheme for the corresponding data packets.

11. The integrated circuit device of claim 1, wherein the first ingress management module comprises a data packet processor that is configured to accumulate the multiple data packets, and generate multiple data units for transmission between the first data processing unit and the second data processing unit, wherein a size of a data unit of the multiple data units is different from a size of a data packet of the multiple data packets.

12. The integrated circuit device of claim 11, wherein the one or more inter-unit data links comprise a first serializer-deserializer (SERDES) disposed on the first data processing unit for transmitting data output by the data packet processor.

13. The integrated circuit device of claim 12, wherein the one or more inter-unit data links comprise a second SERDES disposed on the second data processing unit for receiving the data transmitted by the first SERDES.

14. The integrated circuit device of claim 13, wherein the second data processing unit comprises a data packet assembler that is configured to:
- receive the multiple data units;
- perform error checks on the received multiple data units; and
- assemble the multiple data units into units having the size equal to that of a data packet of the multiple data packets.

15. The integrated circuit device of claim 1, wherein each of the one or more output ports are configured to output data from one or more corresponding output queues.

16. The integrated circuit device of claim 15,
wherein the egress processing module is configured to:
- receive the subset of the multiple data packets from the second arbiter; and
- assign the subset of the multiple data packets to the one or more output queues based on priority information associated with the corresponding data packets.

17. A method of routing data in a network, the method comprising:
- receiving incoming first data at one or more input ports of a first data processing unit of an integrated circuit device configured to operate as a network switch;
- storing the incoming first data using a first ingress management module of the first data processing unit;
- forwarding, by the first ingress management module, the first data in a form of multiple repackaged data packets to at least one second data processing unit of the integrated circuit device through one or more inter-unit data links of the integrated circuit device, the one or more inter-unit data links configured to provide internal connections among a plurality of data processing units of the integrated circuit device;
- generating, by the first ingress management module, metadata associated with the multiple data packets, wherein the metadata includes information usable by the at least one second data processing unit to route the data included in the multiple data packets;
- forwarding, by the first ingress management module, the generated metadata to the at least one second data processing unit through the one or more inter-unit data links;
- receiving incoming second data at one or more second input ports of the second data processing unit;
- storing and processing, using a first ingress arbiter in a second ingress management module of the second data processing unit, one or more second data packets corresponding to the incoming second data;
- forwarding, by the first ingress arbiter, the processed one or more second data packets to an egress processing module of the second data processing unit for transmitting through one or more output ports of the second data processing unit;
- receiving, by a second ingress arbiter of the second data processing unit, (i) the multiple data packets and (ii) at least a portion of the metadata from the first data processing unit through the inter-unit data links;
- processing, by the second ingress arbiter, the multiple data packets based on corresponding portions of the metadata; and
- routing, by the second ingress arbiter based on the processing, the data included in the multiple data packets to the one or more output ports of the second data processing unit as outgoing data.

18. The method of claim 17, further comprising:
performing, by the second ingress arbiter, error corrections on the multiple data packets received from the first data processing unit.

19. The method of claim 18, further comprising:
re-synchronizing, by the first ingress management module, the multiple data packets and corresponding metadata in response to one or more errors being detected in at least one of the multiple data packets and metadata.

20. The method of claim 18, wherein performing error corrections comprises:
- determining, by the second ingress arbiter, that at least a portion of the metadata has not been received correctly based on multiple error correction bits corresponding to the multiple data packets; and
- in response to determining that at least a portion of the metadata has not been received correctly, initiating a loss management scheme for the corresponding portion of the metadata.

* * * * *